United States Patent
Kahle et al.

(10) Patent No.: US 9,031,585 B2
(45) Date of Patent: May 12, 2015

(54) INTEGRATING POSITION INFORMATION INTO A HANDHELD TOOL

(71) Applicant: Trimble Navigation Limited, Sunnyvale, CA (US)

(72) Inventors: Kent Kahle, Hayward, CA (US); Pat Bohle, Boulder, CO (US); Reinhard Waibel, Berneck (CH); Markus Messmer, Wasserburg (DE); Oliver Glockner, Feldkirch (AT); Angela Beckenbauer, St. Gallen (CH); Till Cramer, Jenins (CH); Andreas Winter, Feldkirch (AT)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/689,556

(22) Filed: Nov. 29, 2012

(65) Prior Publication Data
US 2013/0137468 A1     May 30, 2013

Related U.S. Application Data

(60) Provisional application No. 61/564,604, filed on Nov. 29, 2011.

(51) Int. Cl.
| | | |
|---|---|---|
| H04W 24/00 | (2009.01) | |
| G08B 21/00 | (2006.01) | |
| G06G 7/70 | (2006.01) | |
| H04W 4/02 | (2009.01) | |
| G01C 15/00 | (2006.01) | |
| G01S 19/14 | (2010.01) | |
| G06Q 10/06 | (2012.01) | |
| G06Q 10/08 | (2012.01) | |
| G06Q 50/08 | (2012.01) | |

(52) U.S. Cl.
CPC .................. *H04W 4/02* (2013.01); *G01C 15/00* (2013.01); *G01S 19/14* (2013.01); *G06Q 10/0631* (2013.01); *G06Q 10/0833* (2013.01); *G06Q 10/087* (2013.01); *G06Q 50/08* (2013.01)

(58) Field of Classification Search
USPC .......... 345/7, 419, 633; 340/686.5, 679, 13.24
See application file for complete search history.

(56) References Cited

U.S. PATENT DOCUMENTS

| | | | |
|---|---|---|---|
| 5,918,219 A | 6/1999 | Isherwood | |
| 6,433,689 B1 * | 8/2002 | Hovind et al. | 340/573.1 |
| 6,435,286 B1 * | 8/2002 | Stump et al. | 175/26 |
| 6,484,818 B2 * | 11/2002 | Alft et al. | 175/45 |
| 6,544,041 B1 | 4/2003 | Damadian | |
| 6,981,311 B2 | 1/2006 | Seith et al. | |
| 7,245,999 B2 | 7/2007 | Dietsch et al. | |

(Continued)

FOREIGN PATENT DOCUMENTS

| | | |
|---|---|---|
| JP | 2010-039907 | 2/2010 |
| KR | 10-2009-0015354 | 2/2009 |

OTHER PUBLICATIONS

"International Search Report PCT/2012/066906", 22 pages, Sep. 12, 2013.

*Primary Examiner* — William Nealon

(57) ABSTRACT

A method for integrating position information is disclosed. In one embodiment, the position data of an object embedded in a material at a worksite is recorded. The position data is used to update a record showing the position of the object as an embedded object. The position of the embedded object is displayed at a handheld tool.

19 Claims, 9 Drawing Sheets

(56) References Cited

U.S. PATENT DOCUMENTS

| | | |
|---|---|---|
| 7,319,395 B2 | 1/2008 | Puzio et al. |
| 7,613,590 B2 | 11/2009 | Brown |
| 7,681,192 B2 | 3/2010 | Dietsch et al. |
| 8,004,664 B2 | 8/2011 | Etter et al. |
| 8,041,650 B2 | 10/2011 | Gaffey et al. |
| 8,316,741 B2 | 11/2012 | Wallgren |
| 8,362,973 B2 * | 1/2013 | Cernasov et al. ............ 345/8 |
| 8,532,342 B2 | 9/2013 | Nielsen et al. |
| 8,619,022 B1 | 12/2013 | Hart |
| 8,626,384 B2 | 1/2014 | Newman et al. |
| 8,647,124 B2 | 2/2014 | Bardsley et al. |
| 8,657,482 B2 | 2/2014 | Malackowski et al. |
| 8,749,239 B2 | 6/2014 | Nielsen et al. |
| 2004/0172800 A1 | 9/2004 | Seith et al. |
| 2004/0210370 A1 | 10/2004 | Gudat et al. |
| 2004/0248586 A1 * | 12/2004 | Patel et al. ............ 455/456 |
| 2005/0110639 A1 | 5/2005 | Puzio et al. |
| 2006/0155582 A1 | 7/2006 | Brown |
| 2006/0173600 A1 | 8/2006 | Dietsch et al. |
| 2006/0193262 A1 | 8/2006 | McSheffrey et al. |
| 2007/0010925 A1 | 1/2007 | Yokoyama et al. |
| 2007/0027732 A1 | 2/2007 | Hudgens |
| 2007/0210929 A1 * | 9/2007 | Sabata et al. ............ 340/686.5 |
| 2008/0125942 A1 * | 5/2008 | Tucker et al. ............ 701/50 |
| 2008/0133128 A1 | 6/2008 | Koch |
| 2009/0204466 A1 | 8/2009 | Nielsen et al. |
| 2010/0010882 A1 | 1/2010 | Nielsen et al. |
| 2010/0061181 A1 | 3/2010 | Malackowski et al. |
| 2010/0173582 A1 | 7/2010 | Han |
| 2010/0174656 A1 | 7/2010 | Nolan |
| 2010/0275747 A1 * | 11/2010 | Wallgren ............ 81/479 |
| 2010/0295754 A1 * | 11/2010 | Cernasov et al. ............ 345/8 |
| 2011/0249122 A1 | 10/2011 | Tricoukes et al. |
| 2012/0015665 A1 * | 1/2012 | Farley et al. ............ 455/456.1 |
| 2012/0109455 A1 | 5/2012 | Newman et al. |
| 2013/0109375 A1 | 5/2013 | Zeiler et al. |
| 2013/0203032 A1 | 8/2013 | Bardsley et al. |

* cited by examiner

INTEGRATING POSITION INFORMATION INTO A HANDHELD TOOL

CROSS-REFERENCE TO RELATED APPLICATIONS

This Application claims priority to U.S. Provisional Application No. 61/564,604, filed Nov. 29, 2011, titled "Integrating Position Information into a Handheld Tool," by Kent Kahle et al., assigned to the assignee of the present application, and hereby incorporated by reference in its entirety.

This Application is related to U.S. patent application Ser. No. 13/689,519 by Kent Kahle et al., filed on Nov. 29, 2012, titled "Managing Information at a Construction Site," and assigned to the assignee of the present patent application.

This Application is related to U.S. patent application Ser. No. 13/689,529 by Kent Kahle et al., filed on Nov. 29, 2012, titled "Reference Based Positioning of Handheld Tools," and assigned to the assignee of the present patent application.

This Application is related to U.S. patent application Ser. No. 13/689,548 by Kent Kahle et al., filed on Nov. 29, 2012, titled "Integration of as Built Data of a Project," and assigned to the assignee of the present patent application.

This Application is related to U.S. patent application Ser. No. 13/689,575 by Kent Kahle et al., filed on Nov. 29, 2012, titled "Application Information for Power Tools," and assigned to the assignee of the present patent application.

This Application is related to U.S. patent application Ser. No. 13/689,595 by Kent Kahle et al., filed on Nov. 29, 2012, titled "Automated Hand Tool Task Verification," and assigned to the assignee of the present patent application.

BACKGROUND

During the operations involved with erecting a building, or other structure, there are a wide variety of tasks performed every day which utilize positioning information and positioning tools. This includes moving soil, pouring foundations and footers, erecting walls and roofs, and installing interior systems such as HVAC, plumbing, electrical, sprinklers, as well as interior walls and finishing. Typically, these are manually performed operations using tape measures, electronic layout tools (e.g., plumb lasers and digital levels), distance meters, and even survey-type instruments. These tools are used to layout the dimensions of the structures being built. Additionally, these layout tools are often operated by a single user who marks the position of a particular feature while another user installs or builds the feature at the marked position. For example, an operator of an electronic plumb laser marks positions on a wall where holes are to be drilled. Later, another worker actually drills the holes at the indicated positions.

When a project is completed, the final construction drawings are generated which are intended to show where features of a building are actually located. For example, during the course of erecting a building, pipes may have to be re-routed around a structural member. As a result, the actual building is not reflected in the original construction drawings. When this is not shown on the original construction drawings, they are amended on the fly so that they show the features of the building as built. Again, this is often performed manually so that the final construction drawings are an accurate representation of the building as completed.

SUMMARY

A method of integrating position information is disclosed. In one embodiment, the position data of an object embedded in a material at a worksite is recorded. The position data is used to update a record showing the position of the object as an embedded object. The position of the embedded object is displayed at a handheld tool.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Figure 1:
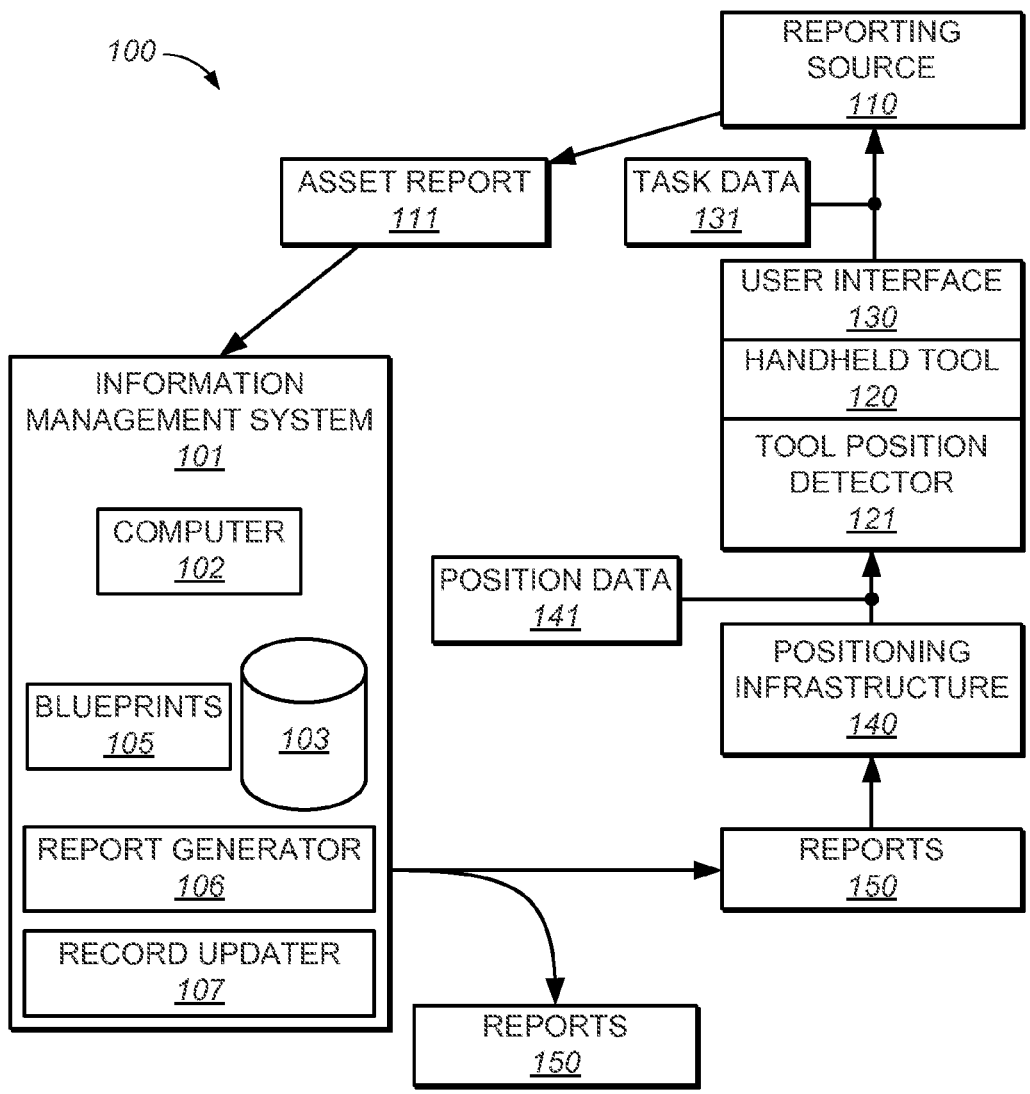
FIG. 1 shows an information management network in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "recording," "using," "displaying," "receiving," "generating," "updating," "conveying," or the like, often (but not always) refer to the actions and processes of a computer system or similar electronic computing device such as, but not limited to, a display unit, a reporting unit, an information management system, a tool interface, or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

The term "handheld tool" is used often herein. By "handheld tool" what is meant is a man-portable device that is used in the construction trade. Some non-limiting examples of handheld tools include manual tools, power tools (e.g., tools powered by electricity, an internal battery, compressed air, an internal combustion engine, or the like), and powder-actuated tools. Handheld tools are often utilized for tasks such as drilling, sawing, cutting, and installing various types of fasteners.

Overview of Discussion

Example units, systems, and methods for construction site management and reporting are described herein. Discussion begins with a description of an information management network in accordance with one embodiment. Example units, systems, and methods for construction site management and reporting are described herein. Discussion continues with a description of an information management network in accordance with various embodiments along with description of some example configurations of components of the information management network. An example positioning infrastructure is described. An example reporting source is described, as are an example tool position detector and an example tool user interface. An example global navigation satellite system (GNSS) receiver is described. Finally, a method and system for integrating coordinate information are then discussed.

Information Management Network

FIG. 1 shows an information management network 100 in accordance with an embodiment. In FIG. 1, an information management system 101, comprising computer 102 and database 103, receives asset information (e.g., asset report 111) from a reporting source 110. In response to user requests, in response to the occurrence of a defined event, or automatically based upon a pre-determined time interval, information management system 101 generates reports 150 to positioning infrastructure 140. Similarly, reporting source 110 can generate asset report 111 in response to user requests, in response to the occurrence of a defined event, or automatically based upon a pre-determined time interval. In accordance with various embodiments, task data 131 comprises data describing events, conditions, and parameters which are recorded at a site. For example, handheld tool 120 can be used to report operating parameters which were implemented upon handheld tool in the performance of a task. Similarly, handheld tool 120 can record the condition of an item such as a structure, a tool, etc. back to information management system 101. It is noted that the recording, and reporting, of this information can occur in real-time, and can include conditions before, during, and after a task have been performed. This information can be used to verify that operations performed by handheld tool 120 were performed in accordance with pre-determined parameters and can show the condition of the finished task. In general, reports 150 comprise data, warnings, or other messages which assist in the completion of a task. In one embodiment, positioning infrastructure 140 can generate position data 141 in response to report 150 which is used to assist an operator in positioning and orienting handheld tool 120 at the correct location to perform a particular task. In one embodiment, user interface 130 is used to direct the operator in positioning and orienting handheld tool 120. It is noted that information management network 100, as well as components thereof such as information management system 101, can be implemented in a cloud computing environment in accordance with various embodiments.

In accordance with one embodiment, database 103 can store and retrieve task data 131 and use that data to generate reports 150. The reports 150 can be used to convey details of a task to be performed such as the position where the task is to be performed, operating parameters when performing the task, alerts, updated scheduling information, or updated blueprints 105 based upon received task data 131, etc. For example, report 150 may comprise a data file (e.g., a computer-aided design (CAD) file), or other building information modeling data, which shows the location within a room where certain tasks, such as drilling holes, are to be performed. Using this information, positioning infrastructure 140 can generate cues which the operator of handheld tool 120 uses to properly place the working end (e.g., the drill bit) at the correct location to drill a hole. Positioning infrastructure 140 can also generate cues which direct the operator to change the alignment/orientation of handheld tool 120 so that the hole is drilled in the proper direction. As a result, separate steps of laying out and marking the positions where operations are to be performed, as well as performing the actual operation itself, can be performed by a single operator in one step. Positioning infrastructure 140 is also configured to determine how far handheld tool 120 has travelled while performing a task, such as drilling a hole, and can generate a message telling the operator of handheld tool 120 to stop drilling when the hole is sufficiently deep. Alternatively, the message from positioning infrastructure 140 can cause handheld tool 120 to automatically shut down when a task is completed. In another embodiment, this message can be generated by information management system 101. This is possible in part because handheld tool 120 is configured with a tool position detector 121. As will be discussed in greater detail below, tool position detector 121 is configured to determine the position of the working end of handheld tool 120 based upon a local, or global reference system. Additionally, tool position detector 121 can be configured to determine the alignment/orientation (e.g., azimuth and tilt) of handheld tool 120. Alternatively, tool position detector 121 is coupled with positioning infrastructure 140 rather than with handheld tool 120.

Upon completion of a task, task data 131 is sent from handheld tool 120 to a reporting source 110. Reporting source 110 then generates an asset report 111 to information management system 101 which facilitates tracking the progress of work at the construction site and automatically updating records such as blueprints 105 in real-time using record updater 107 so that they reflect the as-built configuration of the building. It is noted that the functions described which are attributed to positioning infrastructure 140, tool position detector 121, user interface 130 and reporting source 110 can be implemented in a variety of configurations. In one embodiment, all of these functions are integrated into a single device.

This device can be coupled with, mounted upon, or integrated within handheld tool 120. In another embodiment, some of the above functions (e.g., reporting source 110, positioning infrastructure 140, and/or user interface 130 can be integrated into a handheld device such as a personal computer system, personal digital assistant (PDA), a "smart phone", or a dedicated device. This device is in communication with handheld tool 120 which further comprises tool position detector 121 and, optionally, an additional user interface 130. It is noted that a plurality of handheld tools 120 can send task data to a reporting source 110 in accordance with one embodiment. Similarly, a plurality of handheld tools 120 can receive position data 141 from a single positioning infrastructure in accordance with one embodiment.

Additionally, information management system 101 can prevent inadvertent damage to structures within a building. As an example, blueprints 105 can contain information such as the location of mechanical, electrical, and plumbing features (e.g., pipes, electrical conduits, ventilation ducts, etc.) which have already been built, or will be later. Because asset report 111 provides real-time data on actions performed at a construction site, information management system 101 can determine whether an operator of handheld tool 120 is performing an action which may damage other structures or interfere with the installation of subsequent structures. Information management system 101 can generate a warning (e.g., report 150) to the operator of handheld tool 120 prior to beginning a task so that the operator is aware of the potential damage that could be caused. In one embodiment, positioning infrastructure 140, and information management system 101, can monitor the position of handheld tool 120 in real-time and generate a message which causes handheld tool 120 to automatically shut down to prevent damaging other structures. Additionally, user interface 130 can display, for example, a picture of a wall with the underlying structures overlaid to represent their positions, or a blueprint of the wall with the same information. Again, this means that separate steps of laying out and marking the locations of existing structures are not necessary as the operator of handheld tool 120 can be provided that information directly.

Furthermore, due to the asset management capabilities described herein a significant business management tool is realized. That is, because information management system 101 is useful at all levels of asset management, the information management system 101 provides significant value added features. For example, the asset reports 111 can provide real-time reporting on the progress of a particular task to allow changing the workflow implemented at a construction site. Information management system 101 can also be used to track the maintenance schedule of handheld tool 120, monitor the performance of handheld tool 120, and to track the service life of "consumables" such as drill bits and saw blades. Furthermore, this can be linked with the material being worked upon. For example, knowing whether concrete or steel is being drilled can significantly change the parameters regarding the life of the consumables, safety, and operator performance, as well whether work is progressing at a satisfactory pace and/or whether to generate alerts.

As an example, if asset report 111 indicates that it is taking longer than expected to drill holes using handheld tool 120, information management system 101 can determine whether the drill bit being used by handheld tool 120 is in need of replacement, or if handheld tool 120 itself is in need of maintenance. Determination of how long it takes to perform a task can be based upon, for example, the start time and finish time for a task as reported by handheld tool 120, or the distance handheld tool 120 has moved in performing a task as reported by positioning infrastructure 140. Additionally, as the location of the consumables and handheld tools can be monitored by information management system 101, the process of locating them in order to implement needed repairs is facilitated. This may also include maintaining inventory of consumables so that sufficient stores are maintained at the construction site to prevent unnecessary delays. Alternatively, it may be that an operator of handheld tool 120 is not exerting enough force which causes the drilling of holes to take longer than expected. In one embodiment, information management system 101 can make this determination and generate a report 150 in real-time to the operator of handheld tool 120 which explains that more force should be exerted upon handheld tool 120. Additionally, information management system 101 can ensure that the proper tools, personnel, and other assets are at the correct location at the correct time to perform a particular task. As an example, information management system 101 can ensure that a generator is at the construction site to provide power to handheld tool 120 as well as the correct fasteners for a particular task. This data can also be used to track the life of handheld tools, consumables, etc., from various providers to determine which provider provides a superior product. For example, if drill bits from one provider have a service life 20% lower than those from a second provider, it may indicate that the second provider sells a superior product.

In another embodiment, information management system 101 can monitor workplace safety in real-time. For example, database 103 can maintain a record of what handheld tools a particular operator is allowed to use. In one embodiment, for example user interface 130 can identifier an operator via manual login (such as by operator input of a personally identifying code), automatic electronic login (such as by sensing an personally identifying information provided wirelessly by an RFID badge worn by the employee), or combination thereof. Thus, if the operator has not been trained how to operate a particular handheld tool, workplace safety, or other relevant information, information management system 101 can generate a report 150 which indicates this to the operator. In one embodiment, report 150 may disable handheld tool 120 such that the operator cannot use handheld tool 120 until the required training has been recorded in database 103. Furthermore, information management system 101 can be used to monitor how quickly a particular operator is at performing a task. This information can be used to determine whether additional training and/or supervision is need for that particular operator. In various embodiments, additional sensor devices (e.g., sensors 550 of FIGS. 5A-5C) can be worn by a user and interact with handheld tool 120. Examples of such sensors include, but are not limited to, sensors for recording vibration, dust, noise, chemicals, radiation, or other hazardous exposures which can be collected and reported to information management system 101 to be used as a record against possible health claims.

Additionally, information management system 101 can be used to monitor the quality of work performed at a construction site. As will be discussed in greater detail below, various sensors can be used to send task data 131 which provide metrics (e.g., operating parameters of handheld tool 120 during the performance of a task) for determining how well various operations have been performed. For example, a sensor coupled with handheld tool 120 can determine how much torque was applied to a fastener. This information can be used by, for example, building inspectors to assist them in assessing whether a building is being built in accordance with the building codes. In another example, a camera coupled with handheld tool 120 can capture an image, images, or video showing the work before, during, and after it is performed.

The captured media can verify that the hole was cleanly drilled, did not damage surrounding structures, and that excess material was removed. Furthermore, asset report 111 can not only report what actions have been performed at the construction site, but can also report what materials were used or applied to complete a particular task. Asset report 111 can also be used to notify in real-time whether materials, or consumables, are being used at a greater than expected rate. For example, an operator can generate an asset report via user interface 130 which states that a given material (e.g., an adhesive) is not in stock at the construction site.

Figure 2:
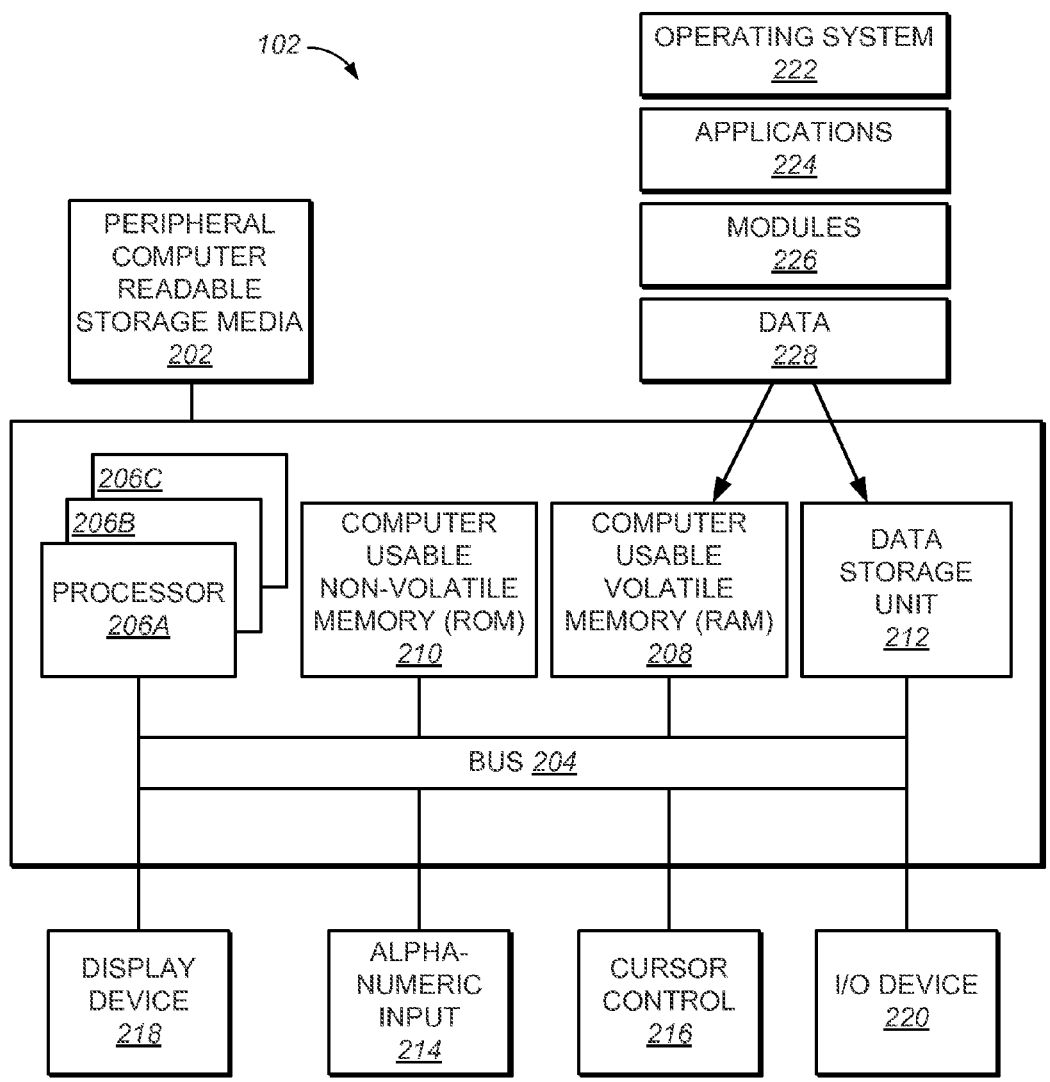
FIG. 2 is a block diagram of an example computer system in accordance with an embodiment.

With reference now to FIG. 2, all or portions of some embodiments described herein are composed of computer-readable and computer-executable instructions that reside, for example, in computer-usable/computer-readable storage media of a computer system. That is, FIG. 2 illustrates one example of a type of computer system (computer 102 of FIG. 1) that can be used in accordance with or to implement various embodiments which are discussed herein. It is appreciated that computer system 102 of FIG. 2 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 102 of FIG. 2 is well adapted to having peripheral computer-readable storage media 202 such as, for example, a floppy disk, a compact disc, digital versatile disc, universal serial bus "thumb" drive, removable memory card, and the like coupled thereto.

Computer system 102 of FIG. 2 includes an address/data bus 204 for communicating information, and a processor 206A coupled to bus 204 for processing information and instructions. As depicted in FIG. 2, computer system 102 is also well suited to a multi-processor environment in which a plurality of processors 206A, 206B, and 206C are present. Conversely, computer system 102 is also well suited to having a single processor such as, for example, processor 206A. Processors 206A, 206B, and 206C may be any of various types of microprocessors. Computer system 102 also includes data storage features such as a computer usable volatile memory 208, e.g., random access memory (RAM), coupled to bus 204 for storing information and instructions for processors 206A, 206B, and 206C. Computer system 102 also includes computer usable non-volatile memory 210, e.g., read only memory (ROM), and coupled to bus 204 for storing static information and instructions for processors 206A, 206B, and 206C. Also present in computer system 102 is a data storage unit 212 (e.g., a magnetic or optical disk and disk drive) coupled to bus 204 for storing information and instructions. Computer system 102 also includes an optional alphanumeric input device 214 including alphanumeric and function keys coupled to bus 204 for communicating information and command selections to processor 206A or processors 206A, 206B, and 206C. Computer system 102 also includes an optional cursor control device 216 coupled to bus 204 for communicating user input information and command selections to processor 206A or processors 206A, 206B, and 206C. In one embodiment, computer system 102 also includes an optional display device 218 coupled to bus 204 for displaying information.

Referring still to FIG. 2, optional display device 218 of FIG. 2 may be a liquid crystal device, cathode ray tube, plasma display device, projector, or other display device suitable for creating graphic images and alphanumeric characters recognizable to a user. Optional cursor control device 216 allows the computer user to dynamically signal the movement of a visible symbol (cursor) on a display screen of display device 218 and indicate user selections of selectable items displayed on display device 218. Many implementations of cursor control device 216 are known in the art including a trackball, mouse, touch pad, joystick or special keys on alphanumeric input device 214 capable of signaling movement of a given direction or manner of displacement. In another embodiment, a motion sensing device (not shown) can detect movement of a handheld computer system. Examples of a motion sensing device in accordance with various embodiments include, but are not limited to, gyroscopes, accelerometers, tilt-sensors, or the like. Alternatively, it will be appreciated that a cursor can be directed and/or activated via input from alphanumeric input device 214 using special keys and key sequence commands. Computer system 102 is also well suited to having a cursor directed by other means such as, for example, voice commands. In another embodiment, display device 218 comprises a touch screen display which can detect contact upon its surface and interpret this event as a command. Computer system 102 also includes an I/O device 220 for coupling computer system 102 with external entities. For example, in one embodiment, I/O device 220 is a modem for enabling wired or wireless communications between system 102 and an external network such as, but not limited to, the Internet.

Referring still to FIG. 2, various other components are depicted for computer system 102. Specifically, when present, an operating system 222, applications 224, modules 226, and data 228 are shown as typically residing in one or some combination of computer usable volatile memory 208 (e.g., RAM), computer usable non-volatile memory 210 (e.g., ROM), and data storage unit 212. In some embodiments, all or portions of various embodiments described herein are stored, for example, as an application 224 and/or module 226 in memory locations within RAM 208, computer-readable storage media within data storage unit 212, peripheral computer-readable storage media 202, and/or other tangible computer-readable storage media.

Figure 3:
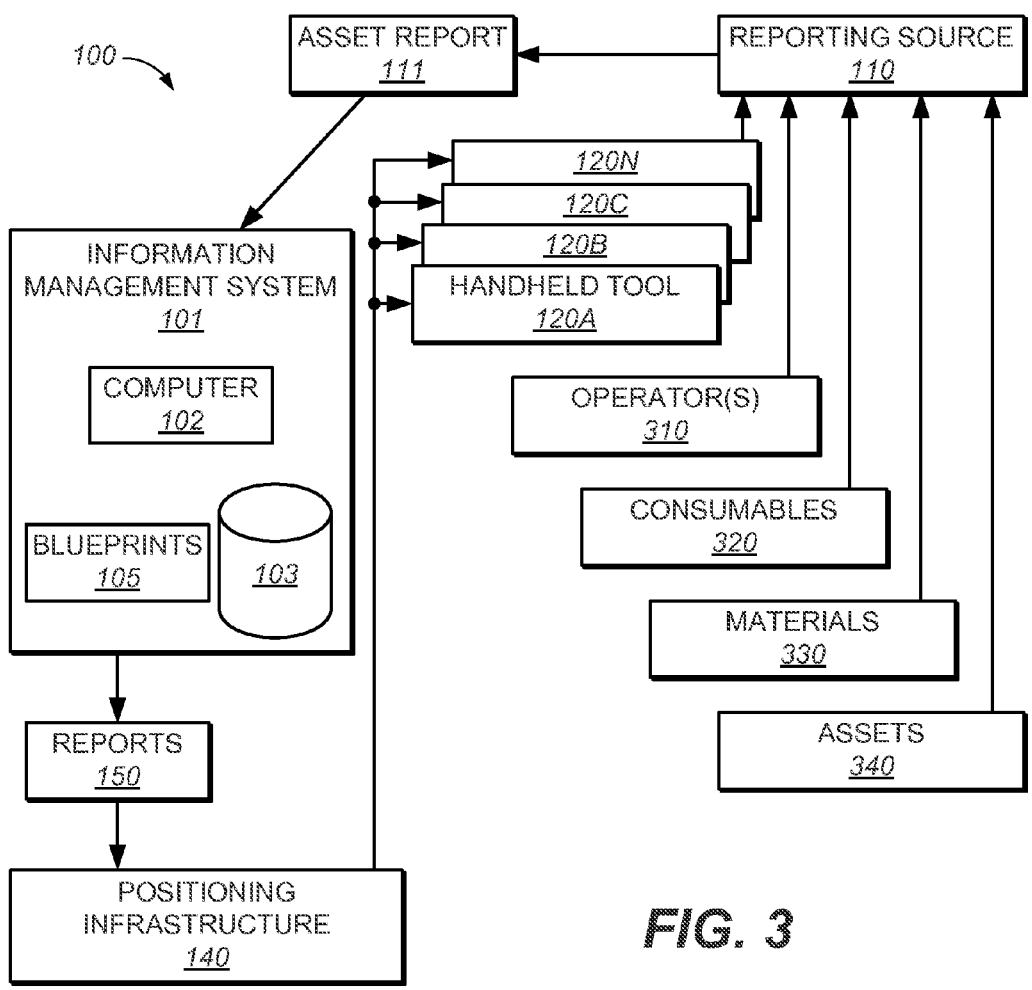
FIG. 3 shows information management network in accordance with an embodiment.

FIG. 3 shows information management network 100 in accordance with an embodiment. As shown in FIG. 3, reporting source 110 receives data such as task data 131 from a handheld tools 120-A, 120-B, 120-C3-120-*n*. In accordance with various embodiments, positioning infrastructure 140 can generate data to a plurality of handheld tools 120 based upon information received via reports 150.

Similarly, reporting source 110 can also receive data from other sources such as operator(s) 310, consumables 320, materials 330, and other assets 340. Identification of these various data sources can be detected and reported automatically, or manually by operator 310 via user interface 130. In accordance with various embodiments, reporting source 110 can comprise a dedicated user interface 130, and other data sensing devices such as, but not limited to, radio-frequency identification (RFID) readers, magnetic card readers, barcode readers, or image capture devices which utilize image recognition software to identify objects. In accordance with one embodiment, assets 340 comprise devices such as air compressors, extension cords, batteries, equipment boxes, fire extinguishers, or other equipment which are used at the construction site. As a result, information management system 101 can integrate data from a variety of sources in order to facilitate workflow, monitor performance, update blueprints 105 on a real-time basis, and generate reports based upon the received information.

Figure 4:
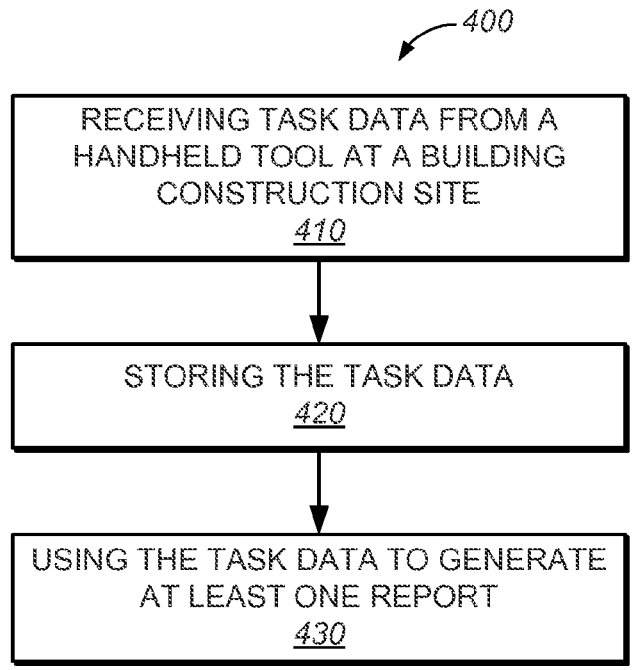
FIG. 4 is a flowchart of a method for managing information at a construction site in accordance with one embodiment.

FIG. 4 is a flowchart of a method 400 for managing information at a construction site in accordance with one embodiment. The flow chart of method 400 includes some procedures that, in various embodiments, are carried out by one or more processors under the control of computer-readable and computer-executable instructions. In this fashion, procedures described herein and in conjunction with the flow chart of method 400 are, or may be, implemented in an automated fashion using a computer, in various embodiments. The computer-readable and computer-executable instructions can reside in any tangible, non-transitory computer-readable storage media, such as, for example, in data storage features such as peripheral computer-readable storage media 202, RAM 208, ROM 210, and/or storage device 212 (all of FIG. 2) or the like. The computer-readable and computer-executable instructions, which reside on tangible, non-transitory computer-readable storage media, are used to control or operate in conjunction with, for example, one or some combination of processor(s) 206 (see FIG. 2), or other similar processor(s). Although specific procedures are disclosed in the flow chart of method 400, such procedures are examples. That is, embodiments are well suited to performing various other procedures or variations of the procedures recited in the flow chart of method 400. Likewise, in some embodiments, the procedures in the flow chart of method 400 may be performed in an order different than presented and/or not all of the procedures described may be performed. It is further appreciated that procedures described in the flow chart of method 400 may be implemented in hardware, or a combination of hardware with firmware and/or software.

In operation 410 of FIG. 4, task data is received from a handheld tool at a construction site. As described above, handheld tool 120 is configured to generate task data which is sent via reporting source 110 to information management system 101.

In operation 420 of FIG. 4, a database is populated with the task data such that the task data can be retrieved from the database. In one embodiment, task data 131 is received in asset report 111. This data can be stored in database 103 for later use such as to generate reports 150. The task data 131 can also be used to automatically update blueprints 105 to reflect the as-built configuration of a building or other structure. The term "as-built" means the actual configuration of features within the building which may, or may not, differ from the original blueprints. For example, a pipe may have to be routed around a beam in the original blueprints. However, as the building is being constructed, it is discovered that the pipe in fact does not have to be routed around the beam. Thus, the as-built configuration found in the updated blueprints shows the location of the pipe which was not routed around the beam. In accordance with various embodiments, the location, disposition, and configuration of structural elements, or other components, at a construction site can be recorded and reported using information management network 100. For example, handheld tool 120, positioning infrastructure 140, or reporting source 110 can be configured to report the completion of tasks, including parameters implemented in the completion of those tasks, to information management system 101.

In operation 430 of FIG. 4, the task data is used to generate at least one report. In accordance with one embodiment, the task data 131 is used to update records at information management system 101. As a result, report 150 can generate instructions, messages, warnings, or the like based upon real-time conditions at the building site.

Example Configurations of Components of Information Management Network

Figure 5A:
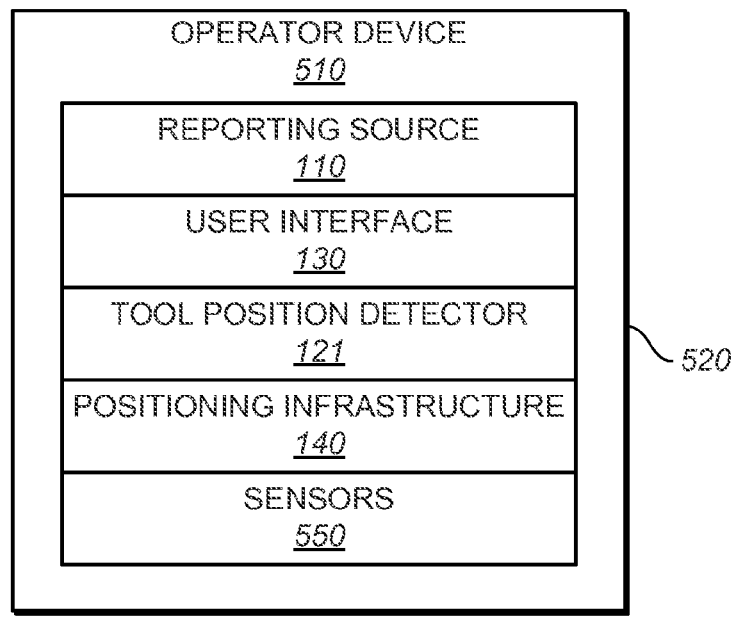
FIGS. 5A, 5B, and 5C show different configurations of components of information management network in accordance with various embodiments.
Figure 5B:
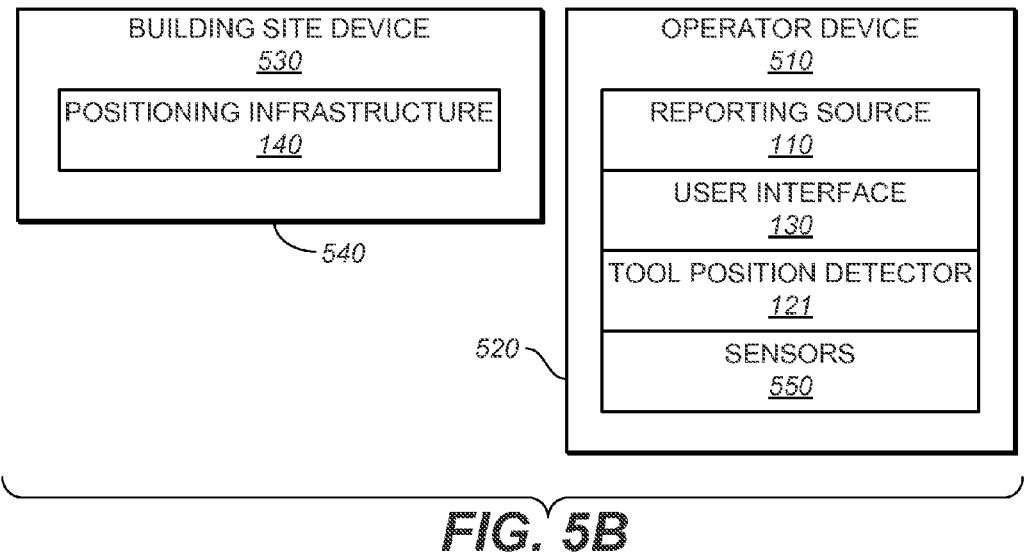
Figure 5C:
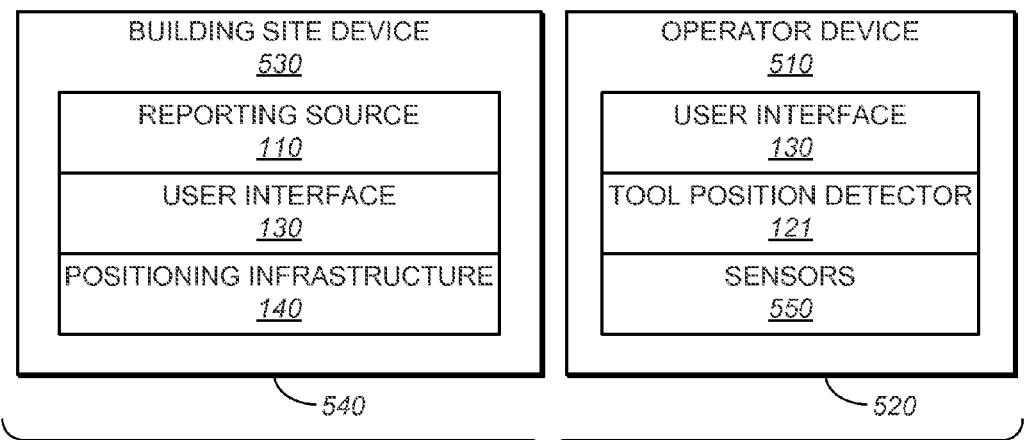

FIGS. 5A, 5B, and 5C show different configurations of components of information management network, in accordance with various embodiments. It is noted the configurations shown in FIGS. 5A, 5B, and 5C are for purposes of illustration only and that embodiments of the present technology are not limited to these examples alone. In FIG. 5A, an operator device 510 (e.g., handheld tool 120) comprises reporting source 110, user interface 130, tool position detector 121, positioning infrastructure 140, and sensors 550.

In accordance with one embodiment, operator device 510 is a stand-alone device coupled with a housing 520. In accordance with various embodiments, housing 520 is comprised of a rigid or semi rigid material or materials. In one embodiment, all or a portion of housing 520 is made of an injection molded material such as high impact strength polycarbonate. In one embodiment, housing 520 is transparent to global navigation satellite system (GNSS) satellite signals such as signals which can be received by tool position detector 121 and/or positioning infrastructure 140. In the embodiment of FIG. 5A, operator device 510 is configured to be coupled with handheld tool 120. For example, operator device 510 can be removably coupled with handheld tool 120 using, a clip-on bracket. In another embodiment, operator device 510 can be coupled with handheld tool 120 using mechanical fasteners such as screws. While not shown in FIG. 5A, when operator device 510 is configured as a stand-alone device it is powered by a battery.

In another embodiment, operator device 510 comprises an integral component of handheld tool 120. In this embodiment, housing 520 comprises the housing of handheld tool 120 itself. In one embodiment, operator device 510 can draw power directly from handheld tool 120.

In accordance with various embodiments, sensors 550 comprise devices which collect information for operator device 510. Examples of sensors 550 include, but are not limited to, an image capture device (or plurality thereof), a depth camera, a laser scanner, an ultrasonic ranging device, a laser range finder, a barcode scanner, an RFID reader, or the like. Sensors 550 may also identify an operator via wireless communication with an operator identification device (e.g., a badge with an RFID coded with operator unique information). A barcode scanner, or RFID reader, can be used to quickly identify objects, or consumables used by handheld tool 120. For example, each drill bit, saw blade, or other consumable can be configured with a barcode, or RFID tag, which provides a unique identifier of that object. Using this information, operator device 510 can access information which correlates that identifier with other characteristics of that object. As an example, a drill bit can be provided with an RFID tag providing a unique identifier to operator device 510. Operator device 510 then accesses a local, or remote, database and determines that the identified object is a ¾ inch drill bit which is 8 inches long. This information can be used by operator device 510 to facilitate properly performing a task as well as provide information which can be included in task data 131 which is forwarded to information management system 101. In one embodiment, operating parameters of operator device 510 can be configured, either manually or automatically, based upon information from report 150 from information management system 101. This information can be used by the operator of handheld tool 120 to verify that he is using the correct drill bit, as well as for later verification that the task was performed up to standard. Also, data can be sent from operator device 510 conveying its settings or operating parameters back to information management system 101. A user of information management system 101 can also use this information to track the use of that drill bit to determine whether it is time to replace it. In another example, sensors 550 can verify that the correct type of fire-proofing material was used by the operator of handheld tool 120. The use of a camera allows an operator of handheld tool 120 to capture an image of the work performed to verify that the task was performed correctly such as at the correct location and in a manner which complies with applicable standards. It is noted that a plurality of operator devices 510 can be communicatively coupled in a mesh network to permit communications between a plurality of handheld tools 120. Thus, in one embodiment, one handheld tool 120 can relay information to a second handheld tool 120. Operator device 510 can also determine and forward information regarding what materials were used to perform a task (e.g., what type of fastener was used), as well as parameters about the task which was performed such as the torque applied to a nut, or the force used to drive an anchor into a substrate. Operator device 510 can also provide real-time metrics during the course of the task being performed. This permits remote monitoring and/or control of the process from another location such as from information management system 101.

In FIG. 5B, operator device 510 comprises reporting source 110, user interface 130, tool position detector 121, and sensors 550. A separate building site device 530 comprising positioning infrastructure 140 is located in the vicinity of operator device 510. Positioning infrastructure 140 comprises sensors, wired and wireless communication components, processors, and software instructions which are disposed in a housing 540 and which facilitate building site device 530 in generating instructions to operator device 510. A more detailed description of these components follows with reference to FIG. 6.

In accordance with various embodiments, building site device 530 is configured to receive report(s) 150 from information management system 101 and to relay some or all of this information to operator device 510. In accordance with various embodiments, building site device 530 can be precisely placed at a set of coordinates in the vicinity of the construction site. By determining the azimuth, direction, and elevation from building site device 530 to other points, building site device 530 can provide positioning cues to operator device to assist an operator in properly placing handheld tool 120 to perform a task. This is possible in part because building site device 530 receives instructions via report 150 such as blueprints 105. Building site device 530 can correlate the features shown in blueprints 105 with its current position to determine where those features are to be located at the building site. Furthermore, avoidance zones can be defined where certain actions are not permitted. For example, if rebar is embedded 6 inches deep within a concrete pillar, it may be permissible to drill down 2 inches into the pillar above the rebar, but no deeper to prevent inadvertently hitting the rebar. It may be necessary to use a certain type of adhesive for a task based upon the substances being glued. In accordance with embodiments of the present technology, this information can be sent to operator device 510 through information management network 100.

As an example, building site device 530 can be placed in a space of a building where a room is being built. Using, for example, a GNSS receiver, building site device 530 can precisely determine its own geographic position. Using the information from blueprints 105, building site device 530 can then determine where features of that room are to be located. For example, building site device 530 can determine the location and distance to the walls of the room being built, as well as other features such as pipes, conduits, structural members and the like which will be disposed in the space behind the wall. It is important for an operator of handheld tool 120 to know the location of these features as well in order to prevent inadvertent damage, or to perform tasks which are intended to tie in with these features. For example, it may be desired to drill through sheetrock into underlying studs in a wall. Building site device 530 can determine where these features are located relative to its own position by leveraging the knowledge of its own position and the data from blueprints 105.

In accordance with various embodiments, building site device 530 is also configured to detect the position and/or orientation of handheld tool 120 and to generate instructions which facilitate correctly positioning and orienting it to perform a task. For example, if a hole is to be drilled in a floor, building site device 530 can access blueprints 105 and determine the location, angle, and desired depth of that hole and correlate that information with the location and orientation of handheld tool 120. Building site device 530 then determines where that hole is to be located relative its own location. Building site device 530 then generates one or more messages to operator device 510 which provide positioning cues such that an operator of handheld tool 120 can correctly position the working end (e.g., the drill bit tip) at the location where the hole is to be drilled. It is noted that a series of communications between building site device 530 and operator device 510 may occur to correctly position the working end of handheld tool 120 at the correct location.

Additionally, building site device 530 may use position and/or orientation information generated by tool position detector 121 to facilitate the process of positioning and orienting handheld tool 120. In one embodiment, once the working end of handheld tool 120 is correctly positioned, building site device 530 can generate one or more messages to facilitate correctly orienting handheld tool 120. This is to facilitate drilling the hole at the correct angle as determined by blueprints 105. It is noted that these actions can be performed by operator device 510 of FIG. 5A as described above. In accordance with various embodiments, multiple building site devices 530 can be positioned at a construction site which are communicatively coupled with each other in a mesh network and with one or more handheld tools 120. It is noted that in one embodiment, user interface 130 comprises an operator wearable transparent display which projects data, such as the location of hidden structures (e.g., pipes or rebar) to the operator. For example heads-up display (HUD) glasses exist which use an organic light emitting diode (OLED) to project data for a wearer. In one embodiment, a wearer of these glasses can see a projection of objects which the operator may want to avoid such as rebar, as well the position at which a task is to be performed. For example, if a hole is to be drilled at a certain location, that location can be projected onto the glasses so that when a user is looking at a wall, the position where the hole will be drilled is displayed by the glasses at the proper location on the wall. Building site device 530 can provide data or images which are projected or displayed directly by a LED or laser projector, or by such HUD glasses, and additionally such HUD glasses may serve a dual purpose of providing eye protection (e.g., as safety glasses) for an operator when operating an handheld tool.

In FIG. 5C, operator device 510 comprises a user interface 130, tool position detector 121, and sensors 550 while building site device 530 comprises reporting source 110, user interface 130, and positioning infrastructure 140. FIG. 5C represents an embodiment in which the functions of reporting source 110 and positioning infrastructure 140 are removed from the operator of handheld tool 120, or from handheld tool 120 itself. In one embodiment, building site device 530, as represented in FIGS. 5B and 5C, can provide positioning and/or orientation information to a plurality of operator devices 510. It is noted that in accordance with various embodiments, user interface 130 may be configured differently. For example, in one embodiment, user interface 130 comprises a touch screen display which is capable of displaying characters, menus, diagrams, images, and other data for an operator of handheld tool 120. In another embodiment, user interface may comprise an array of LED lights which are configured to provide visual cues which facilitate positioning the working end of handheld tool 120 at a given position and the alignment of handheld tool 120 as well. In one embodiment, the display of visual cues is in response to messages generated by building site device 530 and/or operator device 510.

There are a variety of instruments which can be configured to serve the function of building site device 530. One example instrument which can be configured to perform the functions of building site device 530 is a pseudolite which is used to provide localized position information, such as GNSS signal data to operator device 510. Another example instrument which can be configured to perform the functions of building site device 530 is a robotic total station. One example of a robotic total station is the S8 Total station which is commercially available from Trimble Navigation Limited of Sunnyvale, Calif. Another example of an instrument which can be configured to perform the functions of building site device 530 is a virtual reference station (VRS) rover which uses networked real-time kinematics corrections to determine its location more precisely. One example of a VRS rover is the R8 VRS which is commercially available from Trimble Navigation Limited of Sunnyvale, Calif.

Example Positioning Infrastructure

Figure 6:
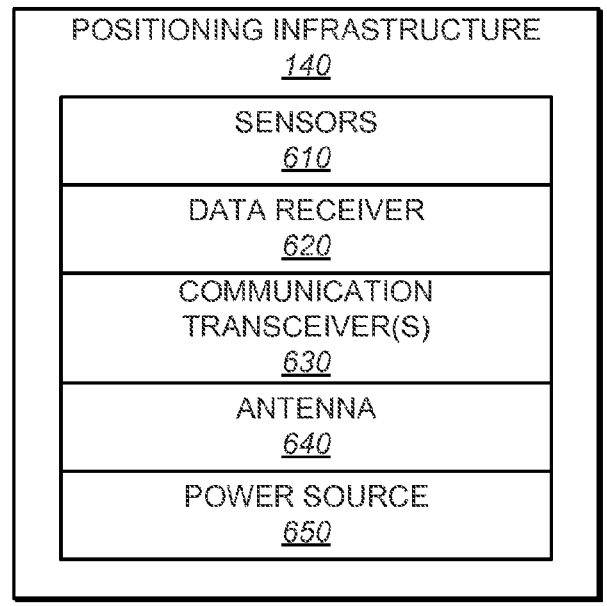
FIG. 6 is a block diagram of an example positioning infrastructure in accordance with one embodiment.

FIG. 6 is a block diagram of an example positioning infrastructure 140 in accordance with one embodiment. In FIG. 6, positioning infrastructure 140 comprises sensors 610, a data receiver 620, one or more communication transceivers 630, an antenna 640, and a power source 650. In accordance with various embodiments, sensors 610 a configured to detect objects and features around positioning infrastructure 140. Some objects include, but are not limited to, handheld tool 120, operators 310, consumables 320, materials 330, and assets 340 as described in FIG. 3. Sensors 610 are also configured to detect objects pertaining to a construction site such as buildings, wall, pipes, floors, ceilings, vehicles, etc. Sensors 610 further comprise devices for determining the position of positioning infrastructure 140 such as a GNSS receiver (e.g., GNSS receiver 1000 of FIG. 10), radio receiver(s), and the like. In another embodiment, the position of positioning infrastructure 140 can be manually entered by an operator using a user interface 130 coupled therewith. It is noted that other objects and features described above can also be manually entered via user interface 130 as well. Examples of sensors 610 in accordance with various embodiments include, but are not limited to, an image capture device, or plurality thereof, an ultrasonic sensor, a laser scanner, a laser range finder, a barcode scanner, an RFID reader, sonic range finders, a magnetic swipe card reader, a radio ranging device, or the like. It is noted that information received via communication transceiver(s) 630 can also be used to detect and/or identify features and objects as well. In accordance with one embodiment, photogrammetric processing of a captured image (e.g., by information management system 101, or positioning infrastructure 140) can be used to detect and/or identify features and objects.

In one embodiment, the location of cameras for photogrammetric processing can be determined by information management system 101 based upon what task is to be performed. For example, if a particular wall is to be drilled, information management system 101 can determine where to place cameras in order to capture images which facilitate photogrammetric processing to determine various parameters of the task being performed. Thus, the location where the working end of the drill bit, depth of drilling, angle of drilling, and other parameters can be determined using photogrammetric processing of images captures by sensors 610. Alternatively, a user can choose where to place the cameras in order to capture images to be used in photogrammetric processing. In another embodiment, cameras can be placed in each corner of a room to capture images of the entire area. In accordance with one embodiment, positioning infrastructure 140 can calculate the respective positions of cameras within a work space by detecting known points from a BIM model. For example, I-beams, or room corners, can be readily identified and, based on their known position, the position of the cameras which have captured those features can be determined. Again, this processing of images, as well as other photogrammetric processing, can be performed by information management system 101 and/or positioning infrastructure 140.

In accordance with one embodiment, when handheld tool 120 is brought into a workspace in which the cameras have been placed, it is captured by at least one camera and its position can be determined by image recognition and triangulation. The orientation of handheld tool 120 can be determined using multiple cameras to determine the roll, pitch, and yaw. Also, the position of the working end of handheld tool 120 can be processed in a similar manner. In accordance with one embodiment, this information can be conveyed to handheld tool 120 to provide real-time feedback to an operator of the position and orientation of handheld tool 120. In one embodiment, the cameras comprising sensors 610 can view multiple handheld tools 120 simultaneously and provide real-time position and orientation information to respective operators of those handheld tools. Additionally, new cameras can be added to adjacent or next work areas and integrated into existing area camera networks to facilitate moving handheld tool 120 to other areas, or to extend coverage of positioning infrastructure 140 in large areas where camera angle and/or range is not adequate.

Data receiver 620 comprises a computer system similar to that described above with reference to FIG. 2. In accordance with various embodiments, data receiver 620 receives reports 150, or other data, and uses this information to generate messages to, for example, operator device 510. As described above, reports 150 can convey CAD files, or other building information modeling data, which describes the location where various objects and structures are to be built at a construction site. Because positioning infrastructure 140 is aware of its own geographic position, it can correlate where these objects and structures are to be located relative to its own location in a local or global coordinate system. As an example, the angle and distance to each pixel in a captured image can be calculated by data receiver 620 in one embodiment. In accordance with various embodiments, positioning infrastructure 140 can generate messages and instructions to operator device 510 which assist in positioning and orienting handheld tool 120 to perform a task. It is noted that some components as described above with reference to FIG. 2, such as processors 206B and 206C, may be redundant in the implementation of data receiver 620 and can therefore be excluded in one embodiment. It is noted that information relating to settings of handheld tool 120 can be relayed via data receiver 620. For example, leveraging knowledge of a material which is being worked on, information on the desired operating parameters (e.g., speed, torque, RPMs, impact energy, etc.)

for handheld tool 120 can be forwarded directly to handheld tool 120. As a result, operator error in setting the parameters for a handheld tool 120 can be reduced.

Communication transceivers 630 comprise one or more wireless radio transceivers coupled with an antenna 640 and configured to operate on any suitable wireless communication protocol including, but not limited to, WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. Personal area network refer to short-range, and often low-data rate, wireless communications networks. In accordance with various embodiments, communication transceiver(s) 630 are configured to automatic detection of other components (e.g., communication transceiver(s) 720, 820, and 920 of FIGS. 7, 8, and 9 respectively) and for automatically establishing wireless communications. It is noted that one communication transceiver 630 can be used to communicate with other devices in the vicinity of positioning infrastructure 140 such as in an ad-hoc personal area network while a second communication transceiver 630 can be used to communicate outside of the vicinity positioning infrastructure 140 (e.g., with information management system 101). Also shown in FIG. 6 is a power source 650 for providing power to positioning infrastructure 140. In accordance with various embodiments, positioning infrastructure 140 can receive power via an electrical cord, or when implemented as a mobile device by battery.

Example Reporting Source

Figure 7:
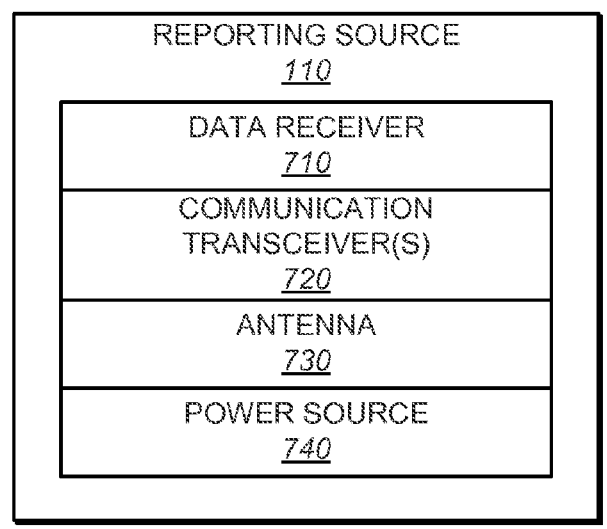
FIG. 7 is a block diagram of an example reporting source in accordance with one embodiment.

FIG. 7 is a block diagram of an example reporting source 110 in accordance with one embodiment. In the embodiment of FIG. 7, reporting source 110 comprises a data receiver 710, a communication transceiver(s) 720, an antenna 730, and a power source 740. For the purposes of brevity, the discussion of computer system 102 in FIG. 2 is understood to describe components of data receiver 710 as well. Data receiver 710 is configured to receive task data 131 generated by, for example, operator device 510 and building site device 530 which describe events, conditions, operations, and objects present at a construction site. Data receiver 710 is also configured to convey this task data 131 in the form of an asset report 111 to information management system 101. It is noted that asset report 111 may comprise an abbreviated version of the task data 131, or may comprise additional data in addition to task data 131. In one embodiment, asset report 111 comprises a compilation of multiple instances of task data collected over time from a single operator device 510, or building site device 530. In another embodiment, asset report 111 comprises a compilation of multiple instances of task data 131 generated by a plurality of operator devices 510, or building site devices 530. In accordance with various embodiments, reporting source 110 can generate asset report 111 periodically when a pre-determined time interval has elapsed, as a result of a request or polling from information management system 101, or as a result of receiving task data 131 from an operator device 510 or building site device 530. It is noted that a user of operator device 510 or building site device 530 can also initiate generating asset report 111.

Reporting source 110 further comprises communication transceiver(s) 720 which are coupled with antenna 730 and a power source 740. Again, for the purposes of brevity, the discussion of communication transceiver(s) 630, antenna 640, and power source 650 of FIG. 6 is understood to describe communication transceiver(s) 720, antenna 730, and power source 740, respectively, of reporting source 110 as well.

Example Tool Position Detector

Figure 8:
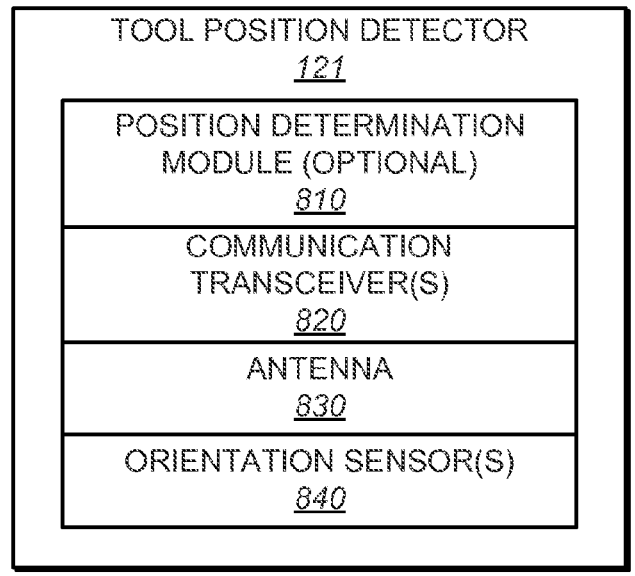
FIG. 8 is a block diagram of an example tool position detector in accordance with one embodiment.

FIG. 8 is a block diagram of an example tool position detector 121 in accordance with one embodiment. In FIG. 8, tool position detector 121 comprises an optional position determination module 810, communication transceiver(s) 820, antenna 830, and orientation sensors 840. In accordance with various embodiments, tool position detector 121 is configured to detect and report the orientation, and optionally, the position of handheld tool 120. It is noted that in accordance with various embodiments, the position of handheld tool 120 can be determined by building site device 530 rather than a device co-located with handheld tool 120. In one embodiment, position determination module 810 comprises a GNSS receiver (e.g., GNSS receiver 1000 of FIG. 10), or another system capable of determining the position of handheld tool 120 with a sufficient degree of precision. It is noted that the position of, for example, antenna 1032 of FIG. 10, can be offset by a user interface 130 coupled with handheld device to more precisely reflect the working end of handheld tool 120. For example, if handheld tool 120 is coupled with a drill bit, user interface 130 of operator device 510 can apply an offset (e.g., 3 centimeters lower and 100 centimeters forward of the position of antenna 1032). In another embodiment, position determination module 810 utilizes a camera which captures images of structures and implements photogrammetric processing techniques to these images to determine the position of handheld tool 120. In at least one embodiment, the captured image can be sent to another component of information management network 100 (e.g., to information management system 101, or to positioning infrastructure 140) to perform the photogrammetric processing of the image captured by position determination module 810. In one embodiment, operator device 510 can use sensors 550 can automatically provide information which identifies a consumable coupled with which handheld tool 120 is coupled. Operator device 510 can then identify characteristics of that consumable so that the working end of handheld tool 120, when coupled with that consumable, can be known. Alternatively, information identifying a consumable can be manually entered by an operator of handheld tool 120 via user interface 130.

Again, for the purposes of brevity, the discussion of communication transceiver(s) 630 and antenna 640 of FIG. 6 is understood to describe communication transceiver(s) 820 and antenna 830 respectively of reporting source tool position detector 121 as well. Orientation sensor(s) 840 are configured to determine the orientation of handheld tool 120 in both an X Y plane, as well as tilt of handheld tool 120 around an axis. In accordance with various embodiments, orientation sensors comprise, but are not limited to, azimuth determination devices such as electronic compasses, as well inclinometers (e.g., operable for determination of tilt in 3 axes), gyroscopes, accelerometers, depth cameras, multiple GNSS receivers or antennas, magnetometers, distance measuring devices, etc., which can determine whether handheld tool 120 is correctly aligned along a particular axis to perform a task. This facilitates correctly orienting/aligning handheld tool 120 above a designated position in order perform a task. Using a drill as an example, once the end of the drill bit coupled with handheld tool 120 has been positioned above the location where the hole is to be drilled (e.g., using cues provided by position determination module 810 and/or a GNSS receiver 1000 disposed within positioning infrastructure 140 of operator device 510 and/or building site device 530) orientation sensors 840 are used to determine whether handheld tool 120 is properly aligned to drill the hole as desired. It is noted that in one embodiment, a series of communications between operator device 510 and building site device 530 may be exchanged in the process of correctly orienting/aligning handheld tool 120. In one embodiment, tool position detector 121 communicates with a user interface 130 of operator device 510 to provide cues to guide the operator of handheld tool 120 in correctly aligning handheld tool 120 along the correct axis. As the operator changes the axis of handheld tool 120 in response to visual cues displayed on user interface 130, orientation sensors 840 will determine the orientation/alignment of handheld tool 120. When it is determined that handheld tool 120 is aligned within pre-determined parameters, an indication is displayed and/or annunciated to the operator of handheld tool 120 via user interface 130.

Example User Interface

Figure 9:
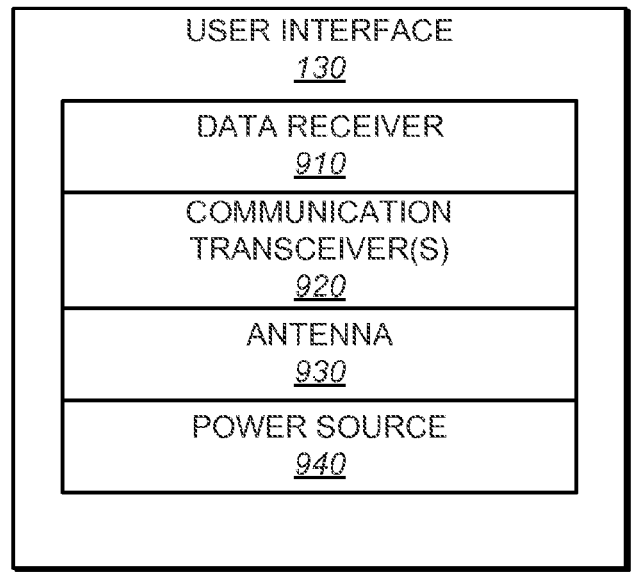
FIG. 9 is a block diagram of an example user interface in accordance with one embodiment.

FIG. 9 is a block diagram of an example user interface 130 in accordance with one embodiment. In FIG. 9, user interface 130 comprises a data receiver 910, communication transceiver(s) 920 coupled with antenna 930, and a power source. For the purposes of brevity, the discussion of computer system 102 in FIG. 2 is understood to describe components of data receiver 910 as well. Also, for the purposes of brevity, the discussion of communication transceiver(s) 630, antenna 640, and power source 650 of FIG. 6 is understood to describe communication transceiver(s) 920, antenna 930, and power source 940 respectively of user interface 130 as well. The user interface 130 is capable of communicating with tool position detector 121, is operable for receiving data, displaying data to an operator of handheld tool 120, detecting and/or selecting materials, assets, consumables, and personnel, reporting operating parameters of handheld tool 120, and reporting task data describing the performance of a task. In one embodiment, user interface 130 is coupled with, or is integral to, handheld tool 120. In another embodiment, user interface 130 can be disposed in a separate device (e.g., operator device 510 or building site device 530). As discussed above, in one embodiment user interface 130 comprises a user wearable display such as a set of heads-up display glasses.

Example GNSS Receiver

Figure 10:
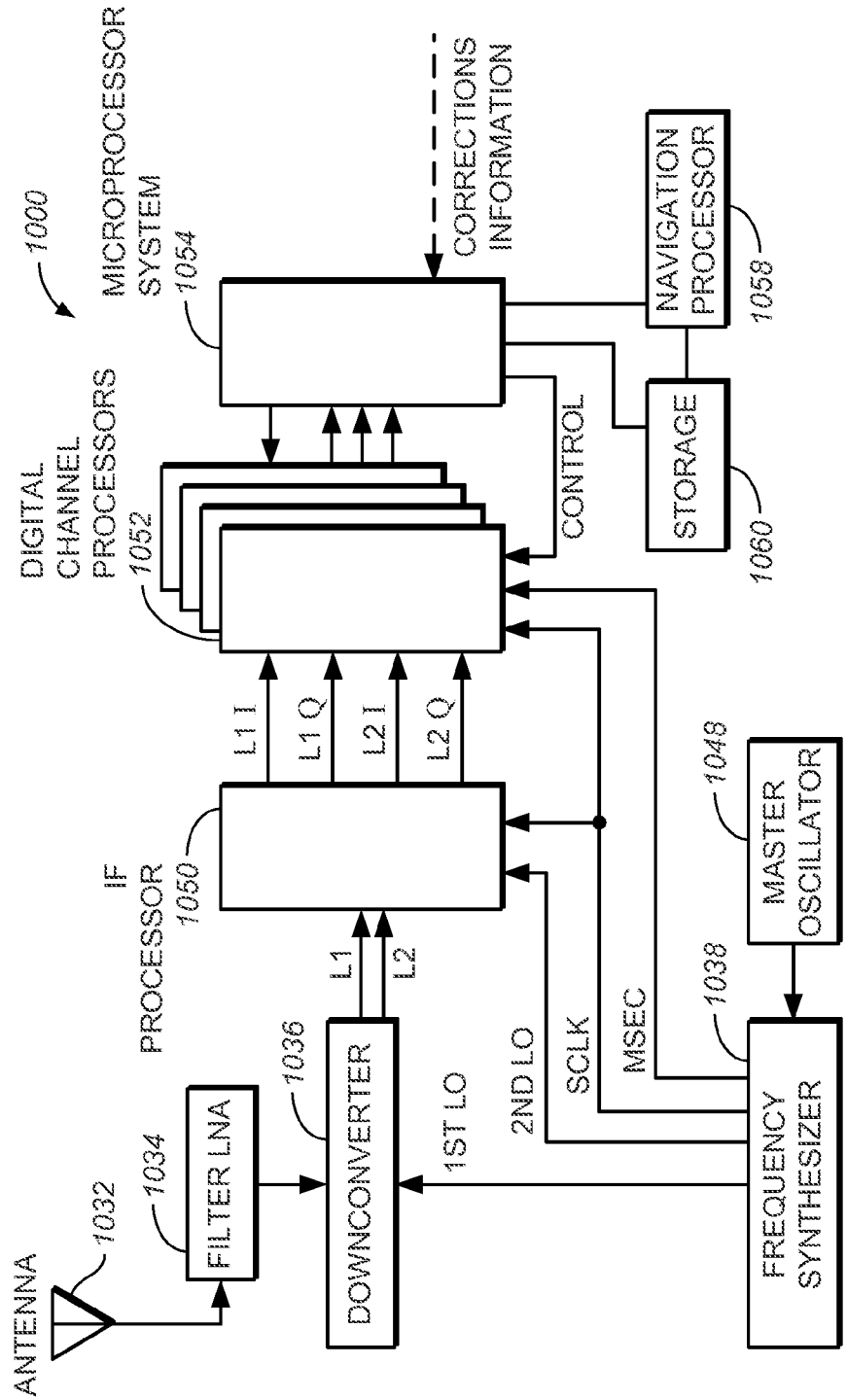
FIG. 10, shows an example Global Navigation Satellite System (GNSS) receiver in accordance with one embodiment.

FIG. 10, shows an example GNSS receiver 1000 in accordance with one embodiment. It is appreciated that different types or variations of GNSS receivers may also be suitable for use in the embodiments described herein. In FIG. 10, received L1 and L2 signals are generated by at least one GPS satellite. Each GPS satellite generates different signal L1 and L2 signals and they are processed by different digital channel processors 1052 which operate in the same way as one another. FIG. 10 shows GPS signals (L1=1575.42 MHz, L2=1227.60 MHz) entering GNSS receiver 1000 through a dual frequency antenna 1032. Antenna 1032 may be a magnetically mountable model commercially available from Trimble Navigation of Sunnyvale, Calif. Master oscillator 1048 provides the reference oscillator which drives all other clocks in the system. Frequency synthesizer 1038 takes the output of master oscillator 1048 and generates important clock and local oscillator frequencies used throughout the system. For example, in one embodiment frequency synthesizer 1038 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1034 performs filtering and low noise amplification of both L1 and L2 signals. The noise figure of GNSS receiver 1000 is dictated by the performance of the filter/LNA combination. The downconvertor 1036 mixes both L1 and L2 signals in frequency down to approximately 175 MHz and outputs the analogue L1 and L2 signals into an IF (intermediate frequency) processor 1050. IF processor 1050 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively. At least one digital channel processor 1052 inputs the digitally sampled L1 and L2 inphase and quadrature signals. All digital channel processors 1052 are typically are identical by design and typically operate on identical input samples. Each digital channel processor 1052 is designed to digitally track the L1 and L2 signals produced by one satellite by tracking code and carrier signals and to from code and carrier phase measurements in conjunction with the microprocessor system 1054. One digital channel processor 1052 is capable of tracking one satellite in both L1 and L2 channels. Microprocessor system 1054 is a general purpose computing device which facilitates tracking and measurements processes, providing pseudorange and carrier phase measurements for a navigation processor 1058. In one embodiment, microprocessor system 1054 provides signals to control the operation of one or more digital channel processors 1052. Navigation processor 1058 performs the higher level function of combining measurements in such a way as to produce position, velocity and time information for the differential and surveying functions. Storage 1060 is coupled with navigation processor 1058 and microprocessor system 1054. It is appreciated that storage 1060 may comprise a volatile or non-volatile storage such as a RAM or ROM, or some other computer-readable memory device or media. In one rover receiver embodiment, navigation processor 1058 performs one or more of the methods of position correction.

In some embodiments, microprocessor 1054 and/or navigation processor 1058 receive additional inputs for use in refining position information determined by GNSS receiver 1000. In some embodiments, for example, corrections information is received and utilized. Such corrections information can include differential GPS corrections, RTK corrections, and wide area augmentation system (WAAS) corrections.

Method and Systems for Integrating Position Information

Currently, detection of embedded objects such as tension cables, rebar, pipes and the like involves running a scanner across a surface and manually transferring the results of the scan onto a piece of paper having a reference grid printed thereon and are subsequently transferred directly onto the surface. The result is that the locations of the embedded objects are drawn onto the surface which hides them. Unfortunately, this method is inaccurate, time consuming, and prone to error. In accordance with one embodiment, the location of embedded objects is measured and recorded prior to them being embedded. For example, the locations of all of the rebar in a reinforced concrete column are measured, recorded, and used to update blueprints 105. As a result, the locations of the embedded objects is known after they have been embedded with a material and the process of using a scanner to detect embedded objects and manually transferring that information onto the surface is not necessary as that information has already been used to update blueprints 105. This information can be sent to operator device 510 so that an operator of handheld tool 120 can be made aware of the presence of embedded objects which may need to be avoided. In accordance with one embodiment, the locations of embedded objects can be projected onto an image captured in real-time by, for example, operator device 510. Thus, as the operator of handheld tool 120 pans around a room, the embedded objects in each wall of the room will be projected onto the image of that wall when displayed by operator device 510. This is one example of an embedded object display system incorporated in a handheld tool 120. In another embodiment, an operator can use the heads-up display eyepiece or glasses described above which will project the locations of the embedded objects in a similar manner, this constitutes another example of an embedded object display system. The HUD may be communicatively coupled with handheld tool 120 to exchange information such as embedded object information and positioning information of handheld tool. An operator can conduct handheld tool work guided directly from the images of the HUD glasses or can utilize the images to quickly and accurately pre-mark locations of hidden objects onto the existing structures.

Figure 11:
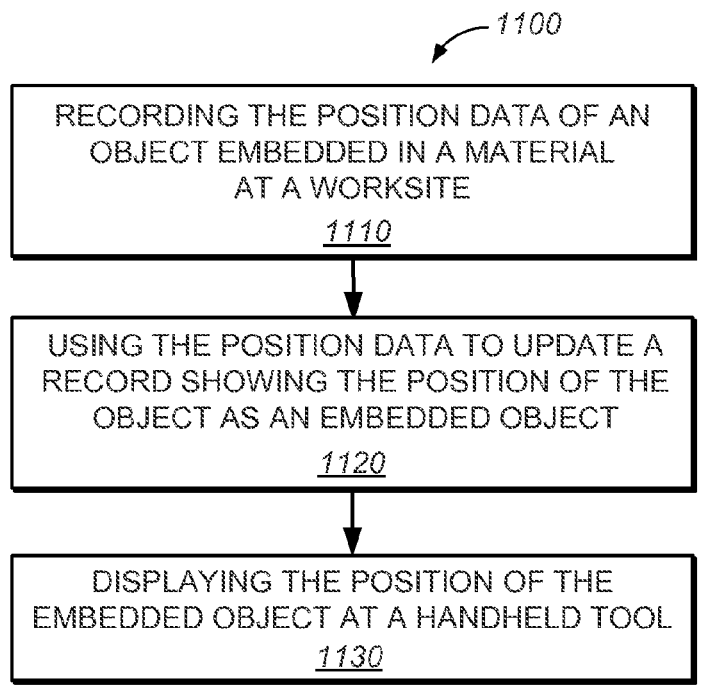
FIG. 11 is a flowchart of a method for integrating position information in accordance with at least one embodiment.

FIG. 11 is a flowchart of a method 1100 of method of integrating position information in accordance with at least one embodiment. The flow chart of method 1100 includes some procedures that, in various embodiments, are carried out by one or more processors under the control of computer-readable and computer-executable instructions. In this fashion, procedures described herein and in conjunction with the flow chart of method 1100 are, or may be, implemented in an automated fashion using a computer, in various embodiments. The computer-readable and computer-executable instructions can reside in any tangible, non-transitory computer-readable storage media, such as, for example, in data storage features such as peripheral computer-readable storage media 202, RAM 208, ROM 210, and/or storage device 212 (all of FIG. 2) or the like. The computer-readable and computer-executable instructions, which reside on tangible, non-transitory computer-readable storage media, are used to control or operate in conjunction with, for example, one or some combination of processor(s) 206 (see FIG. 2), or other similar processor(s). Although specific procedures are disclosed in the flow chart of method 1100, such procedures are examples. That is, embodiments are well suited to performing various other procedures or variations of the procedures recited in the flow chart of method 1100. Likewise, in some embodiments, the procedures in the flow chart of method 1100 may be performed in an order different than presented and/or not all of the procedures described may be performed. It is further appreciated that procedures described in the flow chart of method 1100 may be implemented in hardware, or a combination of hardware with firmware and/or software.

In operation 1110, the position data of an object embedded in a material at a worksite is recorded. As described above, in various embodiments, handheld tool 120 is configured with a position determination module 810. In one embodiment, position determination module 810 can be used to determine the position of an object prior to the object becoming embedded in a material. For example, an operator can use handheld tool 120 to record the position of re-bar prior to pouring concrete to create a footing for a building. Similarly, an operator can use handheld tool 120 to record the position of pipes and studs in a wall prior to hanging sheetrock on the wall. Thus, an embedded object can generally be defined as an object which is covered by, and obscured from viewing, by another material.

In operation 1120 of FIG. 11, the position data is used to update a record showing the position of the object as an embedded object. In at least one embodiment, the position data captured by handheld tool 120 is forwarded to information management system 101 via reporting source 110. In one embodiment, once the position of an object is recorded, and another asset report 111 is received stating that the object has been embedded in a material (e.g., a report that concrete has been poured around the re-bar of a footing), information management system 101 can simply tag the object as an embedded object which has the same position or coordinates as the object had prior to being embedded in a material.

In operation 1130 of FIG. 11, the position of the embedded object is displayed at a handheld tool. In at least one embodiment, information management system 101 generates reports 150 which comprise plans, blueprints (e.g., 105), CAD drawings, etc. to handheld tool 120 via positioning infrastructure 140. Because the position of the object, which is now embedded and thus not visible to an operator of handheld tool 120, has been recorded and stored by information management system 101, this data can be forwarded to handheld tool 120. Thus, even though the object is no longer visible to the operator of handheld tool 120, its position can be displayed so that the operator may not perform an operation which would damage the object. As discussed above, the display of the embedded object can be displayed upon a user interface 130 which is a component of handheld tool 120, or of a building site device 530 which may be proximate to, but not coupled with, handheld tool 120.

Figure 12:
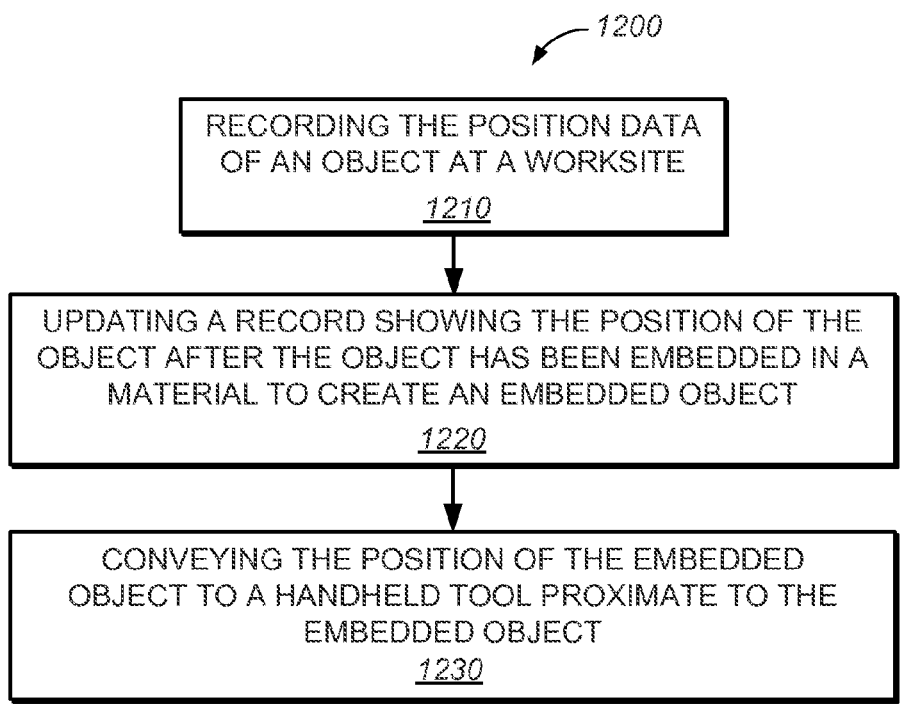
FIG. 12 is a flowchart of a method for integrating position information in accordance with at least one embodiment.

FIG. 12 is a flowchart of a method 1200 of integrating position information in accordance with at least one embodiment. The flow chart of method 1200 includes some procedures that, in various embodiments, are carried out by one or more processors under the control of computer-readable and computer-executable instructions. In this fashion, procedures described herein and in conjunction with the flow chart of method 1200 are, or may be, implemented in an automated fashion using a computer, in various embodiments. The computer-readable and computer-executable instructions can reside in any tangible, non-transitory computer-readable storage media, such as, for example, in data storage features such as peripheral computer-readable storage media 202, RAM 208, ROM 210, and/or storage device 212 (all of FIG. 2) or the like. The computer-readable and computer-executable instructions, which reside on tangible, non-transitory computer-readable storage media, are used to control or operate in conjunction with, for example, one or some combination of processor(s) 206 (see FIG. 2), or other similar processor(s). Although specific procedures are disclosed in the flow chart of method 1200, such procedures are examples. That is, embodiments are well suited to performing various other procedures or variations of the procedures recited in the flow chart of method 1200. Likewise, in some embodiments, the procedures in the flow chart of method 1200 may be performed in an order different than presented and/or not all of the procedures described may be performed. It is further appreciated that procedures described in the flow chart of method 1200 may be implemented in hardware, or a combination of hardware with firmware and/or software.

In operation 1210 of FIG. 12, the position data of an object at a worksite is recorded. Again, in various embodiments, handheld tool 120 is configured with a position determination module 810 which can be used to determine the position of an object prior to the object becoming embedded in a material.

As discussed above, handheld tool 120 can be configured to determine the position of its working end based upon determining the position of an antenna (e.g., 1032) and what type of implement is coupled with handheld tool 120. Thus, an operator can determine the position of an object by putting the working end of handheld tool 120 at the object and determining a position fix for the working end of handheld tool 120. For example, an operator can use handheld tool 120 to record the position of re-bar prior to pouring concrete to create a footing for a building by putting the working end of handheld tool in contact with each piece of re-bar and getting a position fix of the working end of handheld tool 120. Similarly, an operator can use handheld tool 120 to record the position of pipes and studs in a wall prior to hanging sheetrock on the wall by putting the working end of handheld tool 120 in contact with each of these components and getting a position fix of the working end.

In operation 1220 of FIG. 12, a record showing the position of the object after the object has been embedded in a material is updated to create an embedded object. Again, in at least one embodiment, the record indicates that the object is an embedded object and the position data of the object comprises the position data of the embedded object. In at least one embodiment, the position data captured by handheld tool 120 is forwarded to information management system 101 via reporting source 110. In one embodiment, once the position of an object is recorded, and another asset report 111 is received stating that the object has been embedded in a material (e.g., a report that concrete has been poured around the re-bar of a footing), information management system 101 can simply tag the object as an embedded object which has the same position or coordinates as the object had prior to being embedded in a material.

In operation 1230 of FIG. 12, the position of the embedded object is conveyed to a handheld tool proximate to the embedded object. In at least one embodiment, information management system 101 generates reports 150 which comprise plans, blueprints (e.g., 105), CAD drawings, etc. to handheld tool 120 via positioning infrastructure 140. Because the position of the object, which is now embedded and thus not visible to an operator of handheld tool 120, has been recorded and stored by information management system 101, this data can be forwarded to handheld tool 120. Thus, even though the object is no longer visible to the operator of handheld tool 120, its position can be displayed so that the operator may not perform an operation which would damage the object. As discussed above, the display of the embedded object can be displayed upon a user interface 130 which is a component of handheld tool 120, or of a building site device 530 which may be proximate to, but not coupled with, handheld tool 120. As described above, in one embodiment, user interface 130 comprises a set of HUD glasses. Wearing these glasses, an operator of handheld tool 120 can see the position of the embedded object(s) even though they are not visible normally. As an example, is sheetrock has been installed, the operator of handheld tool 120 will look at the sheetrock wall and see displayed on the HUD glasses, the positions of pipes, electrical conduit, studs, and other components. As a result, the operator can find or avoid those components quickly without the need to consult plans and manually plot their positions on the wall before beginning a task.

Embodiments of the present technology are thus described. While the present technology has been described in particular embodiments, it should be appreciated that the present technology should not be construed as limited to these embodiments alone, but rather construed according to the following claims.

What is claimed is:

1. A method of integrating position information comprising:
    determining, performed by a first handheld tool, position data of an object that will be embedded in a material at a worksite;
    recording said position data of said object embedded in said material at said worksite;
    using said position data to update a record showing the position of said object as an embedded object, wherein said position data is not recorded locally with respect to said embedded object and wherein said recording of said position data and said using of said position data are performed by a computerized information management system; and
    displaying the position of said embedded object on a display device integrated with a second handheld tool.

2. The method of claim 1 further comprising:
    receiving real-time data of the progress of a task performed by said first handheld tool while proximate to said embedded object.

3. The method of claim 2 further comprising:
    generating a warning to said first handheld tool of potential damage to said embedded object.

4. The method of claim 2 further comprising:
    generating a message causing said first handheld tool to terminate an operation to prevent damage to said embedded object.

5. A method of integrating position information comprising:
    determining, performed by a handheld tool, position data of an object at a worksite;
    recording said position data of said object at said worksite, wherein said position data is recorded in a record;
    creating an updated record by updating said record showing the position of the object after said object has been embedded in a material to create an embedded object, wherein said updated record indicates that said object is an embedded object, wherein said position data of said object comprises said position data of said embedded object, and wherein said position data is not required to remain local with respect to said embedded object; and
    conveying said position of said embedded object to a handheld tool proximate to said embedded object.

6. The method of claim 5 further comprising:
    conveying to said handheld tool, a distance of said embedded object beneath a surface of said material.

7. The method of claim 5 further comprising:
    receiving real-time data of the progress of a task performed by said handheld tool while proximate to said embedded object.

8. The method of claim 5 further comprising:
    generating a warning to said handheld tool of potential damage to said embedded object.

9. The method of claim 5 further comprising:
    generating a message causing said handheld tool to terminate an operation to prevent damage to said embedded object.

10. The method of claim 5 further comprising:
    generating at least one message which provides a positioning cue for positioning a working end of said handheld tool at a location; and
    generating at least one message which provides a cue for orienting said handheld tool around an axis.

11. The method of claim 5 further comprising:
displaying the position of said embedded object upon a display device coupled with said handheld tool.

12. The method of claim 5 further comprising:
displaying the position of said embedded object upon a set of heads-up display (HUD) glasses.

13. An embedded object display system comprising:

a database that receives, from a first handheld tool, position data of an object at a worksite;

said database configured to store position data of said object at said worksite prior to said object becoming embedded in a material to create an embedded object, wherein none of said database is local with respect to said embedded object;

a report generator configured to generate a report conveying said position data of said embedded object to said handheld tool; and a display device coupled with said handheld tool configured to display said position of said embedded object.

14. The embedded object display system of claim 13 wherein said display device is configured to indicate a distance of said embedded object beneath a surface of said material.

15. The embedded object display system of claim 13 further comprising:
a communication transceiver configured to generate a message conveying real-time data of the progress of a task performed by said handheld tool while proximate to said embedded object.

16. The embedded object display system of claim 15 wherein said communication transceiver is further configured to receive a warning to said handheld tool of potential damage to said embedded object.

17. The embedded object display system of claim 16 wherein said handheld tool is further configured to terminate an operation to prevent damage to said embedded object in response to a received message.

18. The embedded object display system of claim 13 further comprising:
a user interface configured to display a positioning cue for positioning a working end of said handheld tool at a location and to display a cue for orienting said handheld tool around an axis.

19. The embedded object display system of claim 18 wherein said user interface comprises a set of heads-up display (HUD) glasses and wherein the position of said embedded object is displayed upon said set of heads-up display (HUD) glasses.

* * * * *